United States Patent Office 3,032,607
Patented May 1, 1962

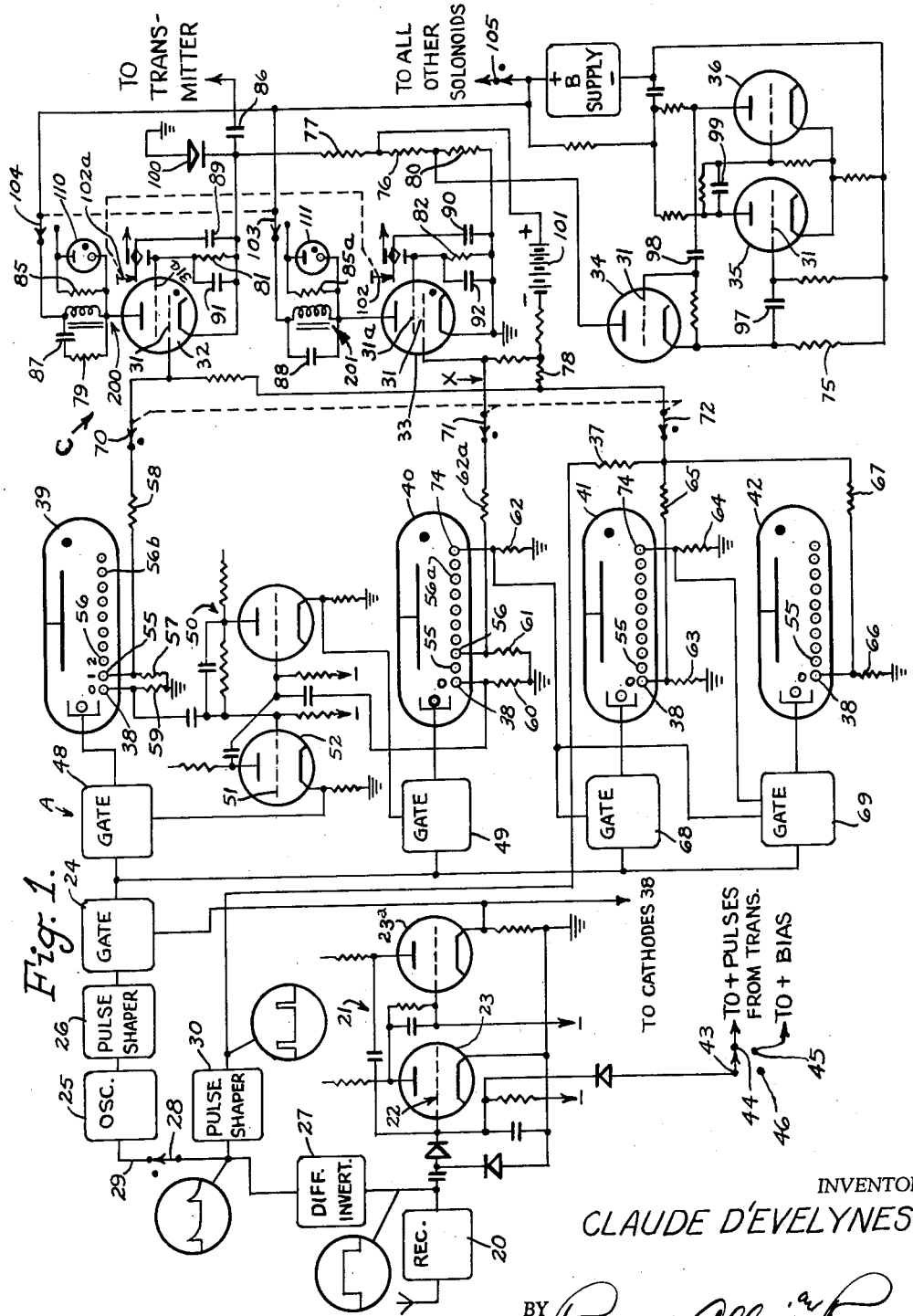

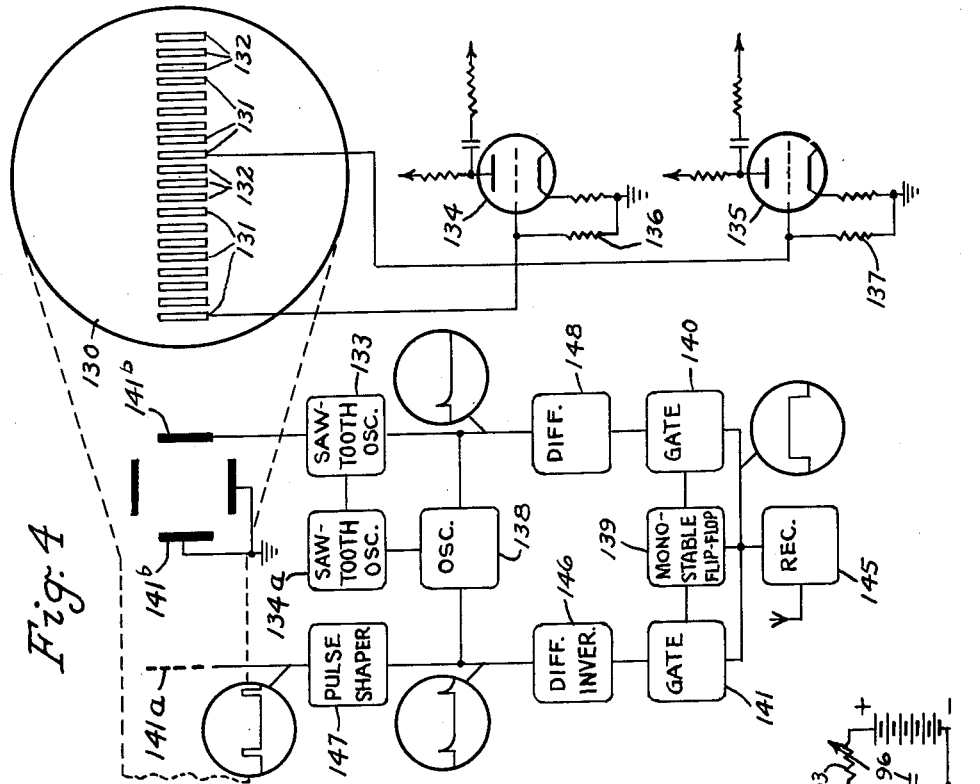
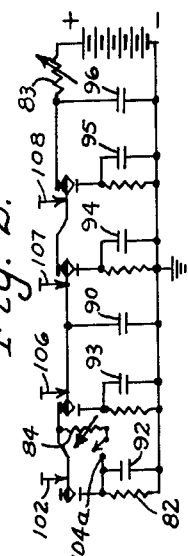
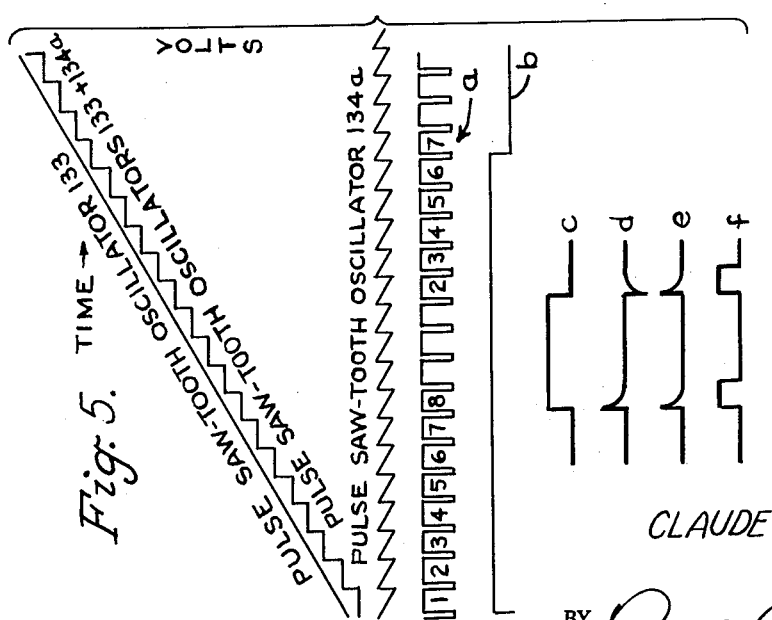

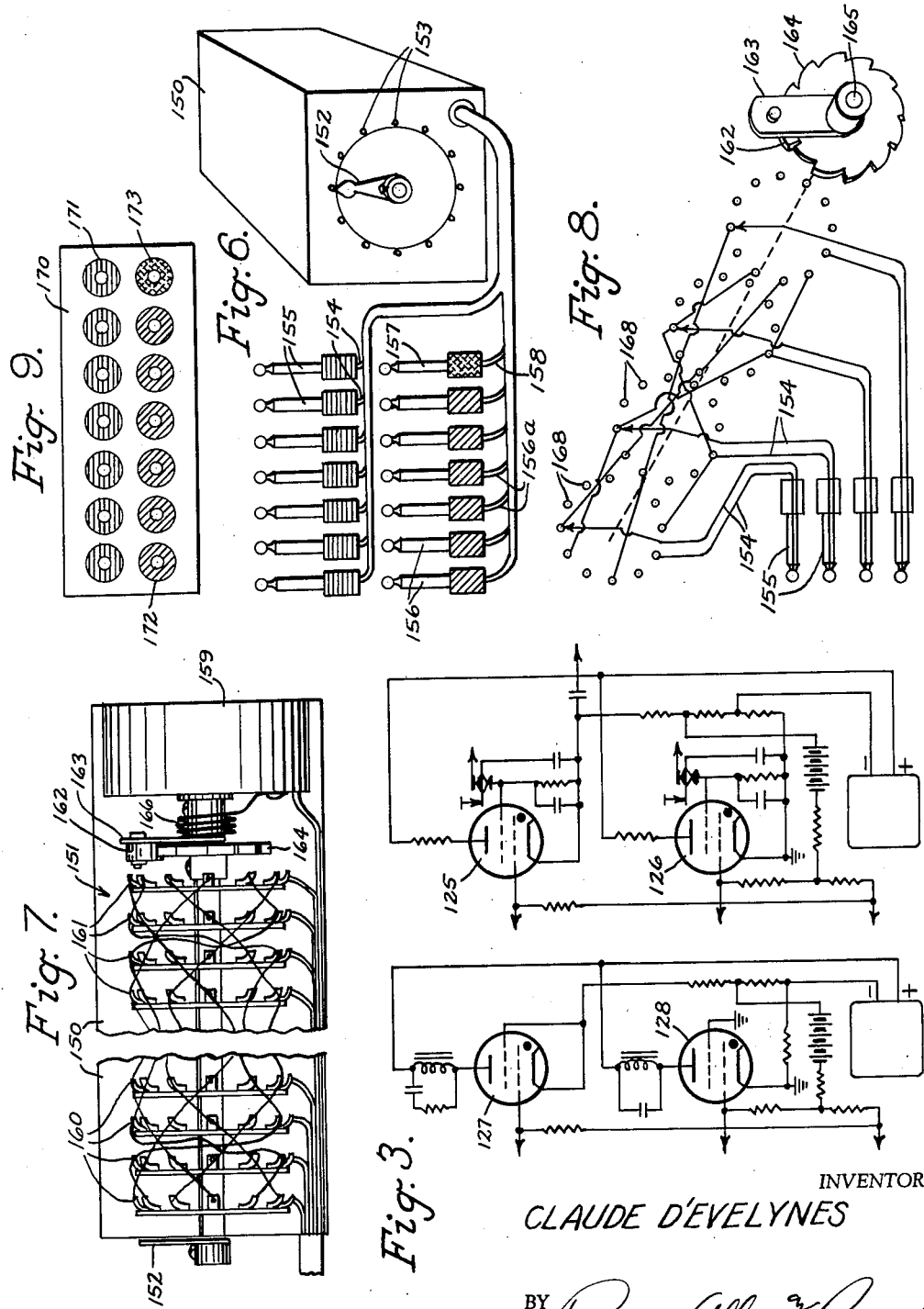

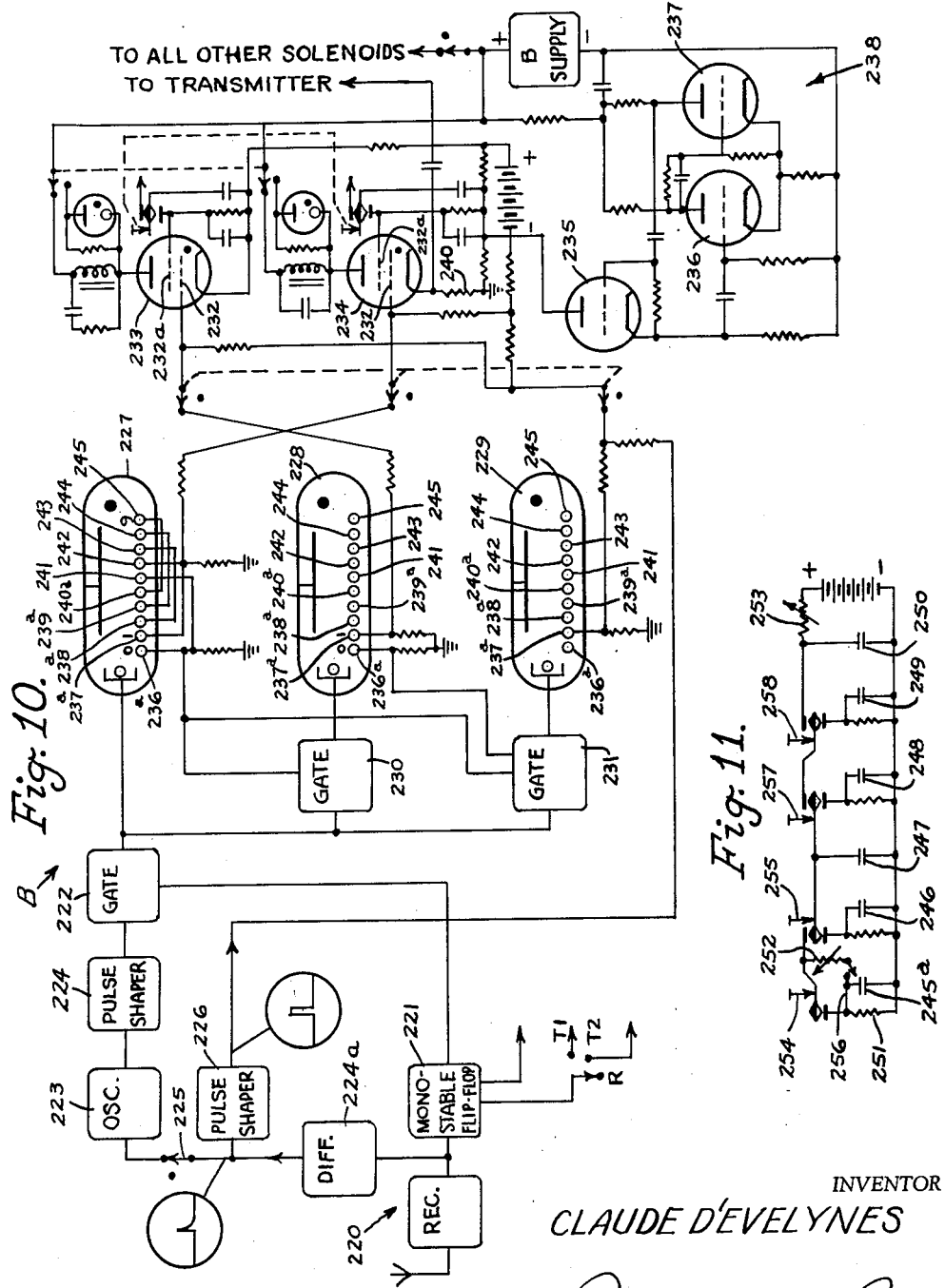

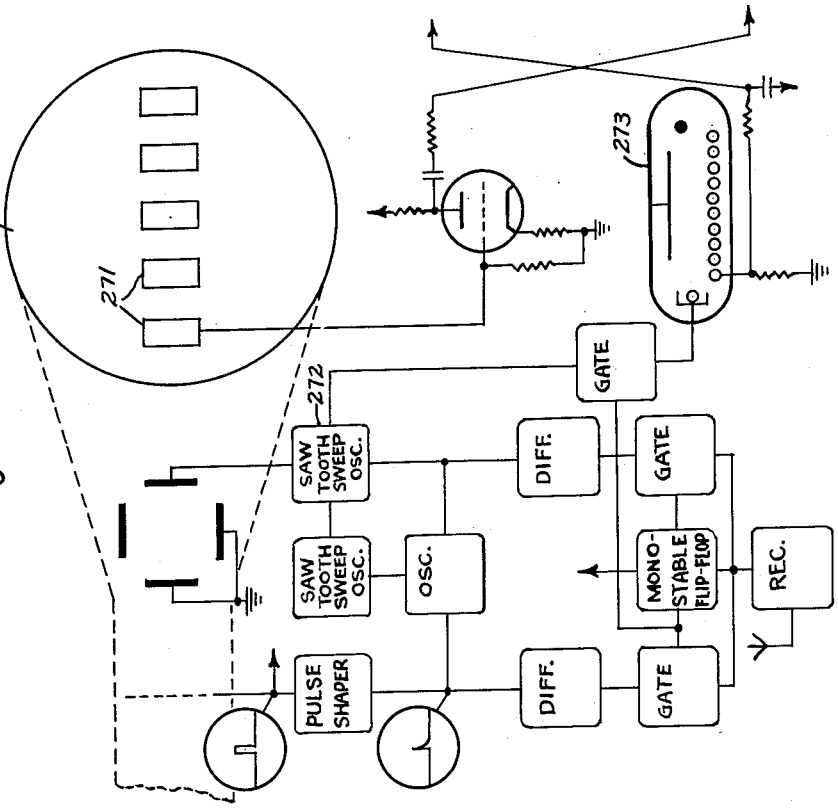
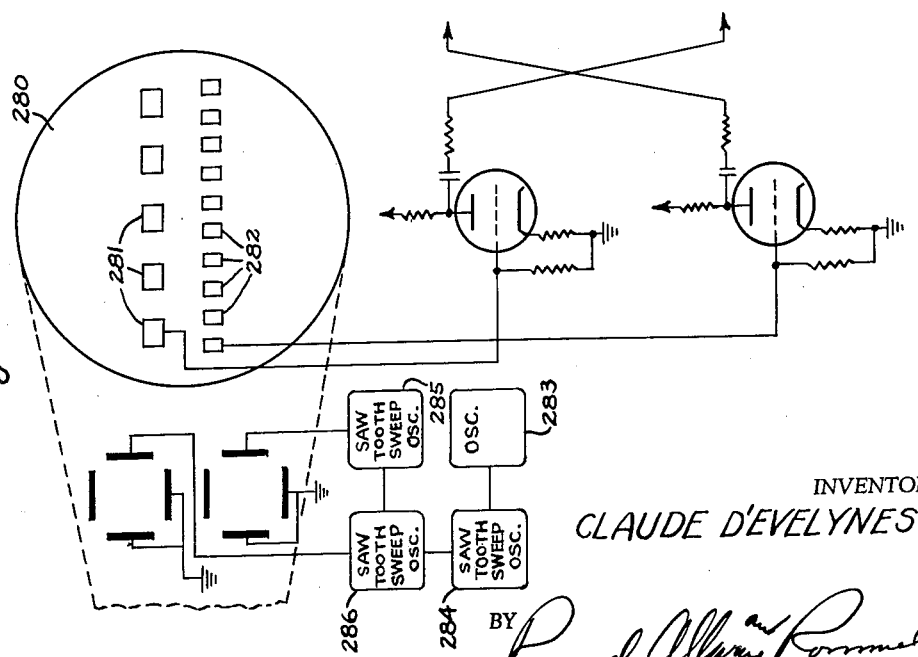

3,032,607
ELECTRONIC TELEGRAPHIC SYSTEMS
Claude D'Evelynes, 26 Stanley St., Chatswood,
New South Wales, Australia
Filed Sept. 14, 1960, Ser. No. 55,943
12 Claims. (Cl. 178—4.1)

This invention relates to telegraphic systems for remotely actuating the functions, as the selecting and selecting operating means, of at least one receiving typewriter in unison with the same functions of a transmitting typewriter, all the typewriters having similar keyboards, such as disclosed in my co-pending application for Letters Patent, Serial No. 56,051, filed September 14, 1960. The systems may be single pulse or plural pulse systems. More specifically, in one case, a system is disclosed wherein the selecting and selecting-operating means of an electronically-controlled typewriter are determined by two pulses, preferably, but not necessarily derived from the differentiation of a single transmitted pulse, such pulse occurring in a cycle or, in the other case, a system employing a single pulse to operate the various functions of an electronically-controlled typewriter, is disclosed, these functions being determined by the time position of the pulse in a cycle.

The differentiated pulse system may alternatively employ two short pulses with the same time relationship as the leading and trailing edges of the single differentiated pulse.

The main advantage of both systems is that, due to the brevity of the signal, a very great number of machines can be operated simultaneously on the same channel. For example, a thousand electronically-controlled typewriters can time share the same high grade channel, or alternatively, a hundred or more machines could operate on one carrier of a multi-carrier system.

Moreover, a system is disclosed which provides for the instantaneous checking back of messages and automatic enciphering and deciphering when required, by means of a continuously varying cipher.

Considering the system as adapted to operate an electronically-controlled typewriter as described in my co-pending application for Letters Patent Serial No. 56,051, filed September 14, 1960, referred to above, the particular embodiment therein described employs a plurality (as 14) electronically-controlled (as by thyratron-control) solenoids arranged in one group of eight in all and one group of six to provide in combination forty-eight functions. A cycling device, preferably employing a suitable electronic tube means, as decade counter tubes, or a cathode ray tube, or their electronic equivalent, may be used, to cycle the control grids of the thyratrons N times per second. In this embodiment, N is reckoned as being 10. Each thyratron has a capacitor across its screen circuit which is connected to the switches operated by the keyboard of the typewriter. Upon depressing a key, an electric charge is stored in the capacitor of one of the thyratrons of each group. When the control grids of the thyratrons are cycled, their voltage is raised sufficiently to cause them to conduct and operate the combination of two solenoids corresponding to the letter desired. The moment the first thyratron conducts, the transmitter is switched to mark, the operation of the second thyratron takes it back to space. At the typewriter receiving end, this pulse is differentiated and two positive-going pulses produced. These pulses are applied to all the thyratrons of the receiving typewriter, which is being cycled in step with the sending machine. As the received pulses occur when the same grids of the thyratrons are being cycled, the corresponding pair of thyratrons conduct and the same letter is typed. In operating, the receiving typewriter also produces a pulse identical to the received pulse, which can be sent on, providing a relay facility, or sent back to indicate that the letter has been received correctly.

In connection with my system, secrecy may be obtained by plugging into the electronic typewriter a unit containing a magnetically-operated rotary switch. This rotary switch is preferably controlled by a switch connected to one or more of the function means of the typewriter. Each time the selected letter or letters are typed, in the course of the message, the rotary switch alters the character of the pulses of every letter. In this way, the cipher is continually changing during the course of the message.

Other objects and advantages of the invention will be apparent during the course of the following description of two embodiments of the invention, described for illustrative purposes, and illustrated in the accompanying drawings, and in which drawings:

FIGURE 1 is a wiring diagram of one embodiment of a transmitting-receiving station with facilities for the simultaneous operation of a plurality of typewriters, and employing decade counter tubes as the cycling devices.

FIGURE 2 is a wiring diagram of an example of keyswitches operated by the keyboard of the typewriter.

FIGURE 3 is a wiring diagram illustrating how the typing-transmitting and the receiving-printing functions of the electronic typewriter can be divided to provide a check back facility.

FIGURE 4 is a wiring diagram illustrating the use of a cathode ray tube as the cycling device.

FIGURE 5 is a graphical illustration of waves and pulses used in the system.

FIGURE 6 is a partly perspective and partly plan view of a multi-contact transposition switch housing and plugs employed in the secrecy provision of the system.

FIGURE 7 is a fragmentary and partly cut-away view in part of transposition switch of FIGURE 6 and the electro-magnetic switch which operates it.

FIGURE 8 is a wiring diagram of part of the wiring of the transposition switch of FIGURE 6 and elevational view of a ratchet operating mechanism of FIGURE 6.

FIGURE 9 is an elevational view of a jack housing and associated jacks for the reception of plugs of FIGURE 6.

FIGURE 10 is a wiring diagram, along the lines of FIGURE 1, but of a single pulse telegraphic system, employing decade counter tubes.

FIGURE 11 is a wiring diagram, along the lines of FIGURE 2, but related to the system of FIGURE 10.

FIGURE 12 is a wiring diagram, along the lines of FIGURE 4, in which a cathode ray tube is employed to replace the first decade counter tube of FIGURE 10.

FIGURE 13 is a wiring diagram of a double-beam cathode ray tube performing the function of the first two decade counter tubes of FIGURE 10.

In the drawings, wherein for the purpose of illustration are shown various embodiments of the invention and wherein similar reference characters designate corresponding parts throughout the several views, the letters A and B designate generally two illustrative forms of the invention and the letter C illustrates generally an electronic typewriter.

Considering the two systems A and B generically as adapted for remotely actuating the functions of at least one receiving typewriter in unison with the actuation of the same functions at a transmitting typewriter, all of the typewriters having similar keyboards wherein the keys are connected for actuation by combinations of electronic switches prearranged in at least two groups for each keyboard, as disclosed in my copending application Serial No. 56,051, filed September 14, 1960, referred to above, there are provided transmitter apparatus operatively connected with the transmitting typewriter; receiver apparatus operatively connected with the receiving typewriter at a receiving station; step-by-step counter cycling means, as decade counter tubes or cathode ray tube, as examples, at each apparatus and connected with each of the groups of electronic switches, one combination count in each of the locally-grouped counter cycling means being operatively associated with two of the electronic switches; oscillator means in each apparatus and connected with the electronic counter cycling means therein for continuously actuating the latter at a uniform rate; synchronizing means in the transmitter and receiver apparatus for maintaining all of the oscillator means precisely in step with each other; pulse means in the transmitter apparatus for transmitting a single pulse coinciding with at least one combination count of the counter cycling means in response to the actuation of each function of the transmitting typewriter; means at the receiver apparatus, connecting each counting step of the local counter cycling means to an associated one of the keyboard electronic switches to apply an enabling bias to the switches successively as the counter means are cycling; and coupling means in the receiving apparatus for applying the transmitted and received pulses to the electronic switches, whereby coincidence at the electronic valves between the pulse and an enabling bias, causes actuation of the associated typewriter function.

Considering the system A, the pulse means and the synchronizing means in the transmitter comprises means for initiating and delivering a substantially rectangular pulse during each cycle of the counter cycling means, each of the pulses having its leading edge coincident with the beginning of a new counting cycle and having its trailing edge coincident with and comprising a signal pulse initiated in response to the function of the typewriter being transmitted during that cycle of the counter cycling means; the receiver apparatus includes pulse-differentiating means for converting the leading and trailing edges of each received rectangular pulse into two narrow pulses for synchronizing the oscillator means controlling the stepping action of the counter cycling means, the synchronizing means in the receiver includes pulse integrating switching and gate means connected to the local counter cycling means and the oscillator means for beginning a new cycle of the counter cycling means in response to the leading edge of the signal pulse.

In the wiring diagrams of the telegraphic system A, best shown in FIGURE 1, the electrical components and the means electrically connecting them together, such as conductors lines and leads, are conventional, except as may be referred to specifically.

Referring mainly to FIGURE 1, the receiving station 20 of the receiving apparatus, is in circuit with a first mono-stable flip-flop circuit, generally known as a "flip flop," 21, which includes grid 22 of the non-conducting valve 23 thereof, connected with a first gate 24 which is, in turn, connected with oscillator 25, with a first pulse shaper 26 of the pulse means interposed therebetween. Pulses from the receiver 20 pass through the circuit of a differentiator-inverter 27 where the differentiated pulses are applied to the oscillator 25 with the switch 28 interposed in line 29. The pair of pulses derived from the single received pulse are conducted through the second pulse shaper 30, in the circuit, to the grids 31 of the thyratrons 32 and 33, via the isolating resistor 37.

The mono-stable flip-flop 21 performs the function of a manual or signal controlled on-off switch connecting the cycling means, decade counter tubes 39—40, with their source of transfer pulses, and oscillator 25, by means of gate 24. With switch 43 in position 46 and in the absence of received signal pulses, flip-flop 21 will flop over to its stable position, closing gate 24 and delivering a pulse to all cathodes 38 via an isolating means (not shown) whereby bringing the cycling means to its position of ready. The leading edge of the first received pulses from the receiver 20 are integrated at grid 22 causing the flip-flop 21 to switch to its unstable position and open gate 24 to start the cycling means, decade counters 39—40, in step with the cycling means at the signal source. Switch 43 is closed at 45 or 44 when transmitting as explained later.

The mono-stable flip-flop 50 is electrically connected to cathodes 38 of decade counter tubes 39 and 40 and gates 48 and 49 in such a manner that transfer pulses from the oscillator 25 are alternately applied to decade counter tube 39 and decade counter tube 40 to provide a 20 position electronic rotary switch which is the counter cycling means cyling the two groups of electronic switches, of which electronic switches thyratrons 32 and 33 constitute one of each group.

The triodes 35 and 36 comprise a mono-stable flip-flop controlling triode 34 to cut off the power supply and extinguish the thyratrons after each operation of the typewriter.

The functions of the grounded resistors 57, 59, 60 to 64 and 66 as well as the resistors 58, 62$^a$, 65 and 67 of FIGURE 1 are obvious, particularly when taken into consideration with their electrical association of some of them with the flip-flop 50 and gates 48, 49, 68 and 69, all of which will be referred to again in connection with the operation of the telegraphic system A. The ganged switch 70—72 is disposed to vary the relationship of the electronic switches of the typewriter C with reference to the counter cycling means decade counter tubes 39—40 and the time-sharing decade counter tubes 41—42. In the interests of simplicity, the cathode capacitors associated with the decade counter tubes 39—42 are omitted. Reference will be made later to the cathodes 74 of the decade counter tubes 40 and 41, and to the resistor 75.

Electric current may be supplied by any suitable source. In the example shown, an electric storage battery 101 is symbolically shown by way of example, and the functions of the switches 102–107 inclusive of FIGURES 1 and 2 are believed clear.

The resistor 85 has the neon indicator tube 110 across it, and the resistor 85$^a$ has the neon indicator tube 111 across it, to provide a visual indication of repetition rate.

Considering the system A electrically connected with an electronic typewriter C, more particularly disclosed in my co-pending patent application Serial No. 56,051, filed September 14, 1960, referred to heretofore, to make ready the station of the system A for receiving at 20 (FIGURE 1), the switch 43 is turned to the position 45. In this position, a fixed positive bias is applied to the grid 22 of the valve 23 of the mono-stable flip-flop 21, which is non-conducting when the flip-flop is in its stable state. This makes the valve conduct and open gate 24. Transfer pulses from the oscillator 25 are now applied to the transfer electrodes of the four decade counter tubes 39–42 via the pulse shaper circuit 26 and gates 48, 49, 68 and 69. When it is observed that the decade counter tubes 39–42 are operating normally, the switch is returned to the "receive" position 46. The fixed bias is now removed from the flip-flop 21 and it will return to its stable state to await signals from the receiver 20. In returning to its stable state the flip-flop 21 delivers a negative-going pulse to the cathode 38 of the decade counter tube 39–42, via a conventional isolating circuit. These cathodes conduct and stay in this starting position, because the gate 24 is now closed and they are isolated from the source of transfer pulses.

It is necessary, of course, for the decade counter tubes at the receiving station to be exactly in step with the decade counter tubes 39–42 at the transmitting station. The oscillator generating the transfer pulses must be synchronized and the stepping action must begin with the conduction of the cathode 55 of the first decade counter tube 39. This is brought about in the following manner: The transmitting station begins transmission by sending a series of signals (such as space bar signals). If the station is employing 100 electronic typewriters, for example, these signals would be sent on the electronic typewriter machine, that is, for example, the machine connected to the cathodes 38 of the decade counter tubes 41 and 42 respectively. The space bar signal begins with the conduction of the cathode 55 of the decade counter 39, and terminates with the conduction of the cathode 56 of the decade counter 40. The thyratrons 32 and 33 are the thyratrons which are adapted to control certain solenoids 200 and 201 referred to later, performing the space bar function. At the receiving station, the pulses from the receiver 20 are passed on to the grid 22 of the non-conducting valve 23 of the mono-stable flip-flop 21, through an integrating circuit, which builds up a positive voltage on the grid, causing the valve to conduct and open gate 24. The flip-flop remains in this condition while signals continue to be received.

While the pulses are being integrated at the grid 22 of the non-conducting valve 23 of the mono-stable flip-flop 21, the oscillator 25 has been brought into synchronism with the corresponding oscillator at the transmitting end. The pulses from the receiver 20 pass through the circuit of the differentiator-inverter 27, where the pulses are differentiated and the negative going pulses inverted to form a second positive going pulse. Both of these pulses are applied to the oscillator 25. The leading edge of both of the pulses derived by differentiating the single received pulse, correspond with the beginning of conduction of decade counter tube cathodes at the transmitting end.

The pulses which are integrated at the grid 22 of the non-conducting valve 23 of the mono-stable flip-flop 21 are positive-going pulses produced by the leading edge of the signal pulses. The flip-flop will therefore flop over and open the first gate 24 at the same instant that a transfer pulse appears at the second gate 48, and the first of the pair of pulses, resulting from the differentiation and inversion of the received pulse, is delivered by the pulse shaper 30, to the grids 31 of all the thyratrons via the isolating resistor 37. Gate 48 is then open, because the second mono-stable flip-flop 50, which controls it, is in its stable state. The transfer pulse is applied to the transfer electrode of the decade counter tube 39, extinguishing the glow at the cathode 38 and leaving cathode 55 conducting. The voltage developed across the cathode resistor 57 is applied, through the isolating resistor 58, to the grid 31 of the thyratron 32, where it combines with the voltage, due to the conduction of the electrodes 38 of the decade counter tubes 41 and 42 and the signal pulse, to bring the grid 31 of the thyratron 32 to the point where it conducts and operates a suitable electrical device, as for example, a solenoid 200, of the selecting means or members of the electronic typewriter C. Such a solenoid, as the solenoid 200, shown in FIGURE 1, is adapted to advance a function bar in each of the six sections of the electronic typewriter, disclosed in my co-pending application Serial No. 56,051 filed September 14, 1960, referred to above.

The oscillator 25 continues to supply transfer pulses which step the decade counter tube 39 until the cathode 38 thereof conducts. The voltage developed across the cathode resistor 59 is applied through a capacitor to the grid 51 of the non-conducting valve 52 of the second mono-stable flip-flop 50. The flip-flop 50 switches the second gate 48 shut and opens the third gate 49. The decade counter tube 39 remains conducting at the cathode 38, while the transfer pulses step the decade counter tube 40 through a cycle.

At the same time that the cathode 56 of the decade counter tube 40 conducts, the second signal pulse, that is, the pulse which occurs, derived from the trailing edge of the signal pulse, and, combining with the voltage developed across resistor 61, causes the thyratron 33 to conduct and operate the solenoid 201 of the selecting-operating means of the electric typewriter C referred to in my co-pending application Serial No. 56,051, filed Sept. 14, 1960, referred to above.

The solenoid 201 is adapted to be connected to one of the operating bars of the electronic typewriter. This operating bar, as disclosed in my co-pending application Serial No. 56,051, filed September 14, 1960, referred to above, engages and operates one of the function bars, in this instance, the one connected to the space-bar mechanism.

The transfer pulses continue to step the decade counter tube 40, until the cathode 74 conducts. The voltage developed across the cathode resistor 62, opens the gate 68. The next transfer pulse steps the decade counter tube 41 to its cathode 55, and the decade counter tube 40 to the cathode 38 thereof. The voltage developed across the resistor 60 operates the mono-stable flip-flop 50, which closes gate 49 and opens gate 48 again.

The cycle is now completed on the first typewriter machine and the next machine is ready to receive. At the completion of the cycle on the tenth machine, the voltage across the cathode receiver 62 combines with the voltage across the cathode resistor 64 of the decade counter tube 41, to open gate 69. The next transfer pulse will take the decade counter tube 41 to its cathode 38, and the decade counter tube 42 to its cathode 55, readying the eleventh electronic typewriter. This process continues until, say, 100 machines have been cycled. This complete cycle would be repeated approximately ten times per second.

For the sake of simplicity, only those cathode resistors necessary to explain the action have been shown in the diagram. Also, only one thyratron and solenoid of the eight employed to operate the function bar advancing mechanism, and one thyratron and solenoid of six associated with the operating mechanism of the electronic typewriter are shown.

The conventional coupling devices which normally would be used between the decade counter tube cathodes and the thyratron grids, in a station of this size, have been omitted also in the interest of simplicity.

When the thyratron 32 conducts and operates the solenoid 200, as mentioned above, current flows through the resistor 75, the triode 34, and the resistors 76 and 77. The voltage developed across resistor 75 by the conduction of thyratron 32 is not sufficient to make the triode 35 conduct. The voltage developed across resistor 76 counteracts the negative bias on the grid 31 of the thyratron 33 by an amount equal to the voltage across the resistor 78. This voltage across resistor 78 is an additional bias applied to the grids 31 of all the thyratrons (preferably of the type of thyratrons 33), which are connected to the decade counter tube 40. The purpose of this additional bias is explained in describing the operation during transmission. The voltage developed across the resistors 76 and 77 is passed on to the transmitter via the capacitor 86, for relaying or checking back. The capicitor 87 and resistor 79 are connected in series across the solenoid 200, to speed up the rise time of this pulse. When the thyratron 33 conducts, the voltage developed across the resistor 80, cancels the effect of the voltage across resistors 76 and 77, and the pulse ends. The capacitor 88 is preferably an electrolytic capacitor which can be sufficiently large to supply power to the solenoid 200 after the plate supply is cut off. This capacitor ensures a steep trailing edge on the pulse, while the diode 100 prevents a negative excursion.

The heavy current passed by the thyratron 33 during the charging of capacitor 88, develops a high voltage across the limiting resistor 75. This voltage is applied, via the capacitor 97, to the grid 31 of the triode 35, which is the non-conducting valve of the mono-stable flip-flop comprising the triodes 35 and 36. The triode 35 now conducts, and the triode 36 is cut off. The resultant rise in the voltage at the plate of triode 36 is applied to the grid 31 of the triode 34 via the capacitor 98. This has, however, little effect on triode 34, which is already conducting heavily because its grid 31 is at cathode potential. When the charge on the capacitor 99 declines sufficiently, the mono-stable flip-flop (triodes 35—36) returns to its stable state, and the resultant negative pulse from the plate of triode 36 cuts off triode 34 and extinguishes the thyratrons 32 and 33.

In order to transmit, the switch arm of the switch 43 would normally remain in contact with the contact 45, if the station employed, for example 100 electronic typewriters. A similar, but separate bank of decade counter tubes, would always be in a receiving position. The individual electronic typewriters would be switched from the transmitting set of decade counter tubes, to the receiving set by means of the ganged switch 70—72.

In one-to-one operation, where it is desirable that a station revert to a receiving position immediately following the transmission of a message, the procedure is as follows: The arm of the switch 43 is first turned to contact 45 to open the first gate 24 and start the decade counter tubes 39—42 cycling. Then, holding the spacer bar of the typewriter down, the arm of the switch 43 is turned to contact 44. After sending enough space bar signals to ready the receiving station, the message is transmitted. The mono-stable flip-flop 21 is held in the unstable position, which keeps gate 24 open, by pulses from the transmitter. Upon completion of the message, after a suitable delay, the flip-flop 21 flops back to its stable position and the station is ready to lock in with any received signal.

When transmitting, the decade counter tubes 39—42 are cycling continuously, as previously stated. Upon depressing a key on the keyboard of the typewriter, a positive charge is placed on the screens $31^a$ of two of the thyratrons, one of each group. In the instance of the pair of thyratrons controlling a typewriter space bar, such is illustrated in FIGURE 1. Depressing the space bar, operates the ganged key switch 102 and $102^a$, which transfers the positive charges on the capacitors 89 and 90 to the capacitors 91 and 92 across the screen grids $31^a$ of the thyratrons 32 and 33 respectively. The resistors 81 and 82 must be sufficiently large so that the voltage is not appreciably diminished during the tenth of a second required to cycle all the thyratrons.

The moment the cathode 55 of the decade counter tube 39 conducts, and the voltage, developed across its cathode resistor 57, is applied to the grid 31 of the thyratron 32 and, because of the added screen voltage, it conducts. The thyratron 33 likewise conducts when its grid is cycled, and the typewriter operates as described previously.

It should be stated that the operating mechanism of the electronic typewriter C, disclosed in my co-pending application Serial No. 56,051, filed Sept. 14, 1960, referred to above, requires that the function bars thereof must be advanced before the operating solenoids function. It is necessary therefore to ensure that the thyratrons controlled by the decade counter tube 39, always conduct before those controlled by the decade counter tube 40. If the operator depressed a key the moment the decade counter tube 40 is starting to receive transfer pulses, the thyratron 33 would conduct before thyratron 32, if it were not for the fact that additional bias, the voltage across resistor 78, is applied to its grid 31. This arrangement ensures that the thyratron 32 conducts first. When thish thyratron conducts, the voltage developed across the resistor 76, reduces the bias on all the operating thyratrons by a voltage equal to the voltage across the resistor 78. The thyratron 33 will, therefore, conduct the next time its grid 31 is cycled by the decade counter tube 40.

The danger of two thyratrons, in either the first or second series of thyratrons conducting at the same time, due to the operator depressing two typewriter keys at the same time, is prevented in two ways: First, by the arrangement of the plate circuit wiring of the thyratrons, and second, by way the keying circuit is wired.

If it so happened that the screen capacitors of two of the first series of thyratrons were charged at the same time, the moment the first one conducted, the voltage developed across the resistor 77 would add sufficient bias to prevent a second one conducting. The voltage developed across the resistor 80 has the same effect, in preventing more than one of the second series of thyratrons conducting at the same time.

FIGURE 2 diagrammatically illustrates the principle of the keying circuit wiring. For simplicity, the wiring of only one series of thyratrons is shown. The capacitors 92, 93, 94 and 95 with their respective shunt resistors, are capacitors connected across the screen $31^a$ of one series of thyratrons. The capacitor 90 is common to the series. The battery represents the supply common to both series.

Each key switch, such as switches 102, 106, 107 and 108, is one of a pair of switches operated by the keys on the keyboard of the typewriter C. The switches 107 and 108 illustrate the way, for example, most of the keys on the keyboard would have their switches wired. It will be observed that, upon depressing the key switch 107, capacitor 90 is isolated from its power source and its charge is shared with capacitor 94. Although the key may be kept depressed, only one operation of the typewriter will result. If the key switches 107 and 108 are depressed at the same time, only capacitor 94 will receive a charge from capacitor 90. If the key switches 106 and 107 are depressed together, the charge on capacitor 90 is distributed between capacitors 93 and 94 and the resultant voltage would be insufficient to make either thyratron conduct.

The key switches 102 and 106 illustrate, by way of example, the arrangement for operative connection with the space bar, underline, period, and any other function it is desired to make repetitive by holding down the key on the keyboard. When the key switch 106 is depressed, the capacitors 93, 90 and 96 are across the screen of the thyratron in parallel. When the thyratron conducts, their charge is reduced to the voltage across the thyratron. After the thyratron plate supply is cut off, the voltage at the screen will build up and cause the thyratron to keep firing on at the repetition rate determined by the adjustment of the variable resistance 83.

Because the receiving station is dependent upon received signals to maintain synchronism with the sending station, it is essential that some form of synchronizing signal be sent when there is no traffic. In this embodiment, the mechanical function of the space bar signal is used as a holding or synchronizing signal with provision to render it inoperative to prevent unnecessary wear and eliminate noise. This is effected by the operation of the four-section switch $104^a$ (FIGURE 2) and 103—104 (FIGURE 1) and is located at the extreme end of the carriage travel.

The closing of the switch $104^a$ in FIGURE 2 has the same effect as holding the space bar key 102 down, except that the variable resistor 84 is added to reduce the repetition rate. The two sections of the switch 103 and 104 in FIGURE 1, substitute the resistors 85 and $85^a$ for the solenoids 200 and 201, which operate the space bar mechanism of the typewriter. These resistors 85 and $85^a$ have the neon indicator tubes 110 and 111 (FIGURE 1) across them to provide a visual indication of the repetition rate. In a multi-machine transmission station, the operator could leave the typewriter in this position at the end of the traffic.

Where the machine is being used alternatively for sending and receiving, in a multi-machine station, the switch 70, FIGURE 1, can be made to operate automatically, after a suitable delay, take the machine over to a set of decade counters connected to the receiver and merely substitute a pair of thyratrons, as 126 and 125 (FIG. 3) with resistors in their plate circuits, sending space bar signals.

The use of the space bar signal as the holding signal is advantageous where a base station is working to a number of out-stations, such as ships, which are not always in attendance. Because the space bar signal is the starting signal, it facilitates synchronism.

A coast station using a ten-channel system would send space bar signals continually on the 0 channel, traffic information on the next channel, and deliver its traffic on the remaining eight channels.

The operator of the ship station, when coming on duty, would open the switch 105 before switching on the receiver, so that when the mono-stable flip-flop 21 opens gate 24, only space bar signals can operate the typewriter. The chance of the gate opening on the 0 channel is directly proportional to the number of channels being used at the time, or better. The operator would switch off and on until the neon tubes 110 and 111 indicated that the machine was synchronized to 0 channel.

FIGURE 3 illustrates a method of dividing the sending and the receiving-printing functions of the system, by the addition of, for example, another fourteen thyratrons to the system. The message is sent by means of a set of thyratrons connected to the keyboard of the typewriter, as the thyratrons 125 and 126. The check-back signal from the distant station is received by a second set of thyratrons, as 127 and 128, connected, as has heretofore been described for other of the thyratrons, to the printing mechanism of the typewriter. The two sets of thyratrons are cycled by separate sets of decade counter tubes as those of FIGURE 1. In this way, it is possible for a station to be sending with one set of thyratrons and receiving its own signals back from the distant station on a second set of thyratrons (as thyratrons 127 and 128, which operate the mechanism of the typewriter). The message then typed at the sending station is actually a copy of the message received at the distant station.

This telegraphic system permits time sharing the one frequency and aerial system for both transmission and reception. A radio station equipped as in FIGURE 1, with accommodation for 100 electronic typewriters, can share the transmit-receive time with a distant station similarly equipped. However, the whole 100 channels cannot be used because of the transit time of the signal between the two stations.

The time taken to cycle the thyratrons of each electronic typewriter of a system using 100 machines at a cycling rate of ten cycles per second, is one milli-second; the time a radio signal takes to travel approximately 186 miles. A station communicating with a distant station 150 miles away, could send on the first 49 channels and then switch to receive. The distant station would have its decade counter tubes synchronized and use them for both transmitting and receiving. It would receive on the first 49 channels, then switch to transmit, using channels 50 to 98 for transmission. The first station would receive with a separate set of decade counter tubes synchronized to the distant station. It would receive on channels 1 to 49. The ratio of machines sending and receiving could be altered at will.

FIGURE 4 illustrates the system using a special cathode ray tube 130 with, for example, 20 contacts, as the contacts 131 and 132, arranged at equal distances inside the face, to provide the same function as the decade counter tubes 39 and 40 of FIGURE 1. The fly-back pulse from the first saw-tooth oscillator 133 provides the transfer pulse for the multiplying decade counter tubes such as referred to above. The positive-going signal pulses from the pulse shaper 147 are applied to the control grid 141a of the cathode ray tube 130 increasing the beam current of the cathode ray tube and therefore the voltage developed across the resistors 136 and 137 in series with the anode contacts across the face of the tube.

The cathode ray tube 130 provides a faster action than the decade counter tubes of FIGURE 1, and, therefore, permits a greater number of electronic typewriters to be used at the same time on the one channel. Twenty contacts are shown, however, only the 14 contacts 131 are used in the present embodiment. They are, reading from the left, 1 to 8 of the first ten, and 2 to 7 of the second ten; corresponding to the numbers 1 to 8 cathodes of the decade counter tube 39 and the numbers 2 to 7 cathodes of the decade counter tube 40 of FIGURE 1. However, a cathode ray tube with 8 contacts in conjunction with a flip-flop electronic switch would provide a similar function. Alternatively, an 8-contact cathode ray tube and a decade counter tube would provide a five-channel system, using the even numbered cathodes for one set of thyratrons and the odd numbered cathodes for the other set.

The two triodes 134 and 135 of FIGURE 4, serve to reverse the polarity and amplify the voltage developed across the resistors 136 and 137 respectively, each time the cathode beam intercepts the contacts in the cathode ray tube to which they are connected. This amplified voltage is applied to the grids of the thyratrons, as the thyratrons 32 and 33 of FIGURE 1, of the electronic typewriter in a similar way to the voltage developed across the cathode resistors of the decade counter tubes 39 and 40 of FIGURE 1. A cathode ray tube of the above described type could also be used to perform the same function as the multiplying decade counter tubes 41 and 42 of FIGURE 1.

Synchronization of the oscillator 138, which controls the saw-tooth oscillator 133 via the saw-tooth oscillator 134a, is obtained in a manner similar to the control of the oscillator 25 in FIGURE 1. The initial space bar signal pulses from the receiver 145, are applied through an integrating circuit to the mono-stable flip-flop 139, which flops over to its unstable position and closes gate 140 and opens gate 141. While this is taking place, the differentiated leading edge of the pulse is being applied through gate 140 to both the oscillator 138 and the saw-tooth oscillator 133. When gate 140 closes and gate 141 opens, the pulses (after differentiation and inversion) are applied to the oscillator 138 only. The oscillator 138 is operating, for example, at 20 times the frequency of the saw-tooth oscillator 133, and is kept synchronous with the sending station by the pulses produced from the leading and trailing edges of all the signal pulses.

The saw-tooth oscillator 134a operates at the fundamental frequency of the oscillator 138. When the output of the saw-tooth oscillator 134a is applied to the deflection plates 141b of the cathode ray tube 130 out of phase with the oscillator 133, the resultant wave, oscillator 133 and oscillator 134a (FIG. 5) causes the cathode beam to jump from contact to contact and dispenses with critical adjustment of the spot width.

The receiver 145, mono-stable flip-flop 139, differentiator-invertor 146, pulse shaper 147 of FIGURE 5 preferably have their equivalents shown in FIGURE 1, and there is also included the differentiator 148, between the saw-tooth oscillator 133 and gate 140.

The 20 cathode pulses (10 each) of the two decade counter tubes 39 and 40, FIGURE 1, are graphically presented at "a" in FIGURE 5. The cathode pulses utilized for the operation of the electronic typewriter in the present embodiment are numbered. They are 1 to 8 inclusive of decade counter tube 39, and numbers 2 to 7 inclusive of the decade counter tube 40.

The longest signal pulse, having a mark-space ratio of 4 to 1, is graphically shown at "b" in FIGURE 5. It begins with the conduction of cathode 55 of decade counter tube 39 and ends with the conduction of cathode 56a of decade counter tube 40. The shortest signal pulse, having a mark-space ratio of 1 to 4, is shown at "c" in FIGURE 5. It begins with the conduction of cathode 56b of decade counter tube 39 and ends with the conduction of cathode 56 of decade counter tube 40. The two sharp pulses produced by differentiating the leading and trailing edges of this short pulse are shown at "d" in FIGURE 5. The negative going pulse is inverted to present two positive going pulses "e" to the pulse shaper, which delivers two short pulses of a controlled length "f" (FIGURE 5) to thyratron grids 31, as of FIGURE 1.

When this telegraphic system is used on VHF or UHF radio channels, instead of transmitting a single pulse and deriving two pulses by differentiation at the receiving end, the two pulses which determine each character, may be transmitted as two very short pulses. This makes possible a very short transmitter duty cycle and permits a proportionate increase in radiated power from a given power source.

When this telegraphic system is operated over band lines, instead of a station sending a mark and space signal, i.e., pulses, the low frequency generated by the oscillator 25, FIGURE 1, can be transmitted, and the pulses resulting from the operation of the electronic typewriter can be used to modulate this low frequency carrier. In the instance of the embodiment outlined in FIGURE 1, the carrier frequency would be 20,000 cycles per second.

This method of application has obvious advantages. It would reduce inter-channel interference, facilitate the synchronizing of the receiving station, and permit the simultaneous use of other frequencies on the same line or channel.

The carrier frequency need not be the same as the transfer pulse frequency, but may be a multiple or other derivative. For example, if it is desired to operate ten electronic typewriters on a line carrying telephone traffic, instead of using the transfer pulse frequency, that is, 2,000 cycles per second as the carrier, some multiple of this frequency higher than the audible range of the telephone receiver. For example, 10,000 cycles could be used, and the transfer frequency could be derived from this carrier frequency at both the sending and receiving ends.

Secrecy is effected by varying the relationship of the thyratrons of the type of thyratrons 32 and 33, for example, with respect to the cycling device by means of a multi-contact multi-bank transposition switch, operated by a magnetic device controlled by a switch which is closed each time a predetermined letter or letters of the typewriter are operated. It is necessary for the receiving typewriter to have its switch connected to the same letter or letters as the sending party.

It will be observed from a study of the electronic typewriter described in my co-pending patent application, Serial No. 56,051, filed Sept. 14, 1960, referred to above and of the foregoing, that the order in which the thyratrons, controlling the various functions of the typewriter C, are cycled is quite arbitrary, with the exception of the space bar signal, if it is used as the synchronizing medium. However, it is only necessary for the start of the space bar signal to begin at the same place in the cycle, that is, with the conduction on cathode 55 of the decade counter tube 39 (FIGURE 1). The space bar signal could terminate with any of the cathodes of the decade counter tube 40.

This would leave seven thyratrons controlling the advancing solenoids of the typewriter which could have their order of cycling varied with one another, and six thyratrons controlling the operating solenoids which can be variously arranged in a similar manner; although the two groups must remain separate from each other.

FIGURE 6 illustrates a switch housing 150 adapted to contain a 13-bank 12-position rotary switch 151, with a pointer 152 at one end and indices 153 to indicate the position of the contacts. Attached to the leads 154 coming from the box are seven two-contact plugs 155 and of one color such as blue; six two-contact plugs 156, of a second distinguishing color (as green); and a single two-contact plug 157 of a third color (as orange).

The leads 158 to the single plug 157 are electrically connected to the electro-magnet 159, FIGURE 7, which rotates the switch. The leads 154 and 156ª to the other two groups of plugs are connected to the switch wafers as may be appreciated in FIGURE 8, where a portion of the electric leads 154 of four of the plugs and four contacts 168 of the switch wafers of one group have been drawn to show an example of a transposition arrangement.

FIGURE 9 shows the jack panel 170 which may be associated with the electronic typewriter C. The seven closed circuit jacks 171 and the six closed circuit jacks 172 below, are wired between the grids 31 of all of the thyratrons and the cycling means, at the point marked X in the grid circuit of the thyratron 33, FIGURE 1. The thyratron 32 would be the only one not having a jack in its grid circuit, because it is the thyratron controlling the start of the space bar signal.

The open circuit jack 173 (FIGURE 9) is connected to a source of direct current and the switch operated by a chosen letter or letters of the typewriter.

FIGURE 7 is a fragmentary drawing of part of the transposition switch in the switch box 150, FIGURE 6, showing the pointer 152, four sections 160 of a seven-section switch for transposing the positions of the advancing thyratrons with relation to their cycling device, and four sections 161 of the six-section switch used to transpose the operating thyratrons.

When the rotary magnetic electro-magnet 159 is rotated, the pawl 162 attached to the arm 163 engages the ratchet wheel 164, rotating the shaft 165 of the switch substantially 30 degrees (see also FIGURE 8), causing the switch to advance one position. Upon completion of the operation, the electro-magnet is returned (rotated) to its position of rest by the spring 166 and the pawl 162 engages the next tooth of the ratchet wheel 164.

In this way, 12 of over 3½ million possible combinations are used throughout the text of the message, preventing sufficient sampling of the text to permit deciphering.

The signals sent by this system may be converted to the codes used by other teleprinters. A system, as mentioned in the present embodiment, that selects 48 functions could quite well control 48 relays, the contacts of which could provide a different mark-space arrangement. However, a much simpler arrangement using only 13 relays has been worked out to provide all the combinations of the five character teleprinter code.

Since the electronic typewriter C, which may be associated with this telegraphic system is described and illustrated in my co-pending application referred to above, only the electric devices which are associated with the thyratrons are referred to herein by reference characters, i.e., the solenoids 200 and 201 (in FIGURE 1).

Referring now to the telegraphic system (single pulse system) B, where only one pulse, instead of two, as in the case of the system A, is required to obtain substantially the same results, the system B has particular application with VHF transmitters using a very short-duty cycle. The system is designed to operate an electronically controlled typewriter, according to the embodiment herein described, having fifteen thyratron-controlled solenoids arranged in two groups of five and ten and so mechanically connected as to provide, in combination, fifty functions. A cycling device employing a cathode ray tube, decade counter tubes, or the electronic equivalent, is used to cycle the control grids of the thyratrons N times per second. Each thyratron has a capacitor across its screen, which is connected to the switches operated by the keyboard of the typewriters. Upon depressing a key, an electric charge is stored in the capacitor across the screen of one of the thyratrons in each groups. When these thyratrons have their control grids cycled, the voltage is raised sufficiently to make them conduct and operate the combination of two solenoids which will type the letter desired. The conduction of the operating thyratron produces a pulse which is transmitted. At the receiving end, this pulse is applied to all the thyratrons at the receiving typewriter, the grids of which are being cycled in step with the sending machine. As the pulse occurs when the same grids are being cycled, the corresponding pair of thyratrons conduct and the same letter is typed.

In the wiring diagrams (FIGURES 10-13) of the telegraphic system B, the electrical components and the means electrically connecting them together, such as conductors, leads and lines, are conventional except as may be referred to specifically.

Considering FIGURE 10, the receiving station 220 is in circuit with a mono-stable flip-flop 221, which is preferably substantially like the mono-stable flip-flop 21 of FIGURE 1, with the cathode of its conducting valve electrically connected with a gate 222 which is, in turn, electrically connected with the transfer oscillator 223 with a first pulse shaper 224 interposed. Electrically connected between the receiving station 220 and oscillator 223 is a differentiator 224ª, with switch 225 interposed. There is also a second pulse shaper 226 disposed substantially as is the pulse shaper 30. Gate 222 is disposed, as is gate 24, with respect to a first decade counter tube 227 while gates 230 and 231 are disposed as are the gates 49 and 68 of the system of FIGURE 1 with respect to decade counter tubes 228 and 229. Pulses are conducted to the second pulse shaper 226, in the circuit, to the grids 232 of thyratrons 233 and 234. Triodes 236—237 and their connections constitute a flip-flop circuit 238 controlling the triode 235, while the functions and connections of the various electrical components at the right of FIGURE 10 are believed to be clear from the diagram. References will be made subsequently to some of them.

The decade counter tube 227 has its cathodes 236ª–240ª inclusive, wired in parallel with the cathodes 241–245 inclusive so that, in effect, it only counts to five. At the completion of each cycle of five pulses, the gate 230 is opened and the decade counter tube 228 is advanced one position. Together, decade counter tubes 227 and 228 constitute a 50-position rotary switch. After receiving 50 pulses from the transfer oscillator 223, the decade counter tubes 227 and 228 will be conducting at the cathodes 236ª, which will open gate 231. The next transfer pulse will advance the decade counter tube 229 one position and ready the next electronic typewriter to receive a cycle of pulses from the cathodes of the decade counter tubes 227 and 228.

Synchronization of the decade counter tubes at the receiving end is brought about by sending space-bar signals. The space-bar signal is the pulse coincident with the conduction of the thyratrons connected to the cathodes 237ª of the decade tubes 227 and 228. When sufficient number of these pulses has been received to synchronize the oscillator 223, gate 222 opens and the first transfer pulse is applied to the three decade counter tubes 227–229, transferring the conduction from the cathode 236ª to the cathode 237ª in each decade counter tube. The signal pulse from the pulse shaper 226 is applied to all the thyratron grids immediately the transfer pulse ends. The thyratrons 233 and 234 are the thyratrons controlling the solenoids which operate the space bar of the typewriter. Thyratron 233 is one of ten thyratrons controlling the advancing solenoids of the typewriter and thyratron 234 is one of five thyratrons controlling the operating solenoids thereof. The coincidence of the received pulse from the pulse shaper 226 with the combined voltages from the cathodes of the three decade counter tubes will cause both thyratrons 233 and 234 to conduct.

When transmitting, a voltage is applied to the screens 232ª of the thyratrons as previously described. The grids of the thyratrons controlling the operating solenoids are cycled by the decade counter tube 227 after each step of the decade counter tube 228. The conduction of the operating thyratrons, before the thyratrons controlling the advancing solenoids, is prevented by added grid bias, which is offset by the conduction of one of the latter thyratrons, as in the double pulse telegraphic system. The single transmitted pulse is obtained from the voltage developed across the cathode resistor 240 when the thyratron controlling the operating solenoid conducts.

FIGURE 11 diagrammatically illustrates the principle of the keying circuit wiring. For simplicity, the wiring of only one series of thyratrons is shown. The capacitors 245ª, 246, 248 and 249, with their respective shunt resistors, are capacitors connected across the screens 232ª of one series of thyratrons. The capacitor 247 is common to the series. The battery represents the supply common to both series. Each key switch, such as switches 254, 255, 257 and 258, is one of a pair of switches operated by the keys on the typewriter keyboard. The switches 257 and 258 illustrate the way, for example, most of the keys on the keyboard would have their switches wired. It will be observed that, upon depressing the key switch 257, capacitor 247 is isolated from its power source and its charge is shared with capacitor 248. Although the typewriter key may be kept depressed, only one operation of the typewriter will result. If the key switches 257 and 258 are depressed at the same time, only capacitor 248 will receive a charge from capacitor 247. If the key switches 255 and 257 are depressed together, the charge on capacitor 247 is distributed between capacitors 246 and 248 and the resultant voltage would be insufficient to cause either thyratron to conduct. Key switches 254 and 255 illustrate, by way of example, the arrangement for operative connection with the space bar, underline, period and the like or any other function desired to be made repetitive by holding down the keyboard key. When the key switch 255 is depressed, the capacitors 246, 247 and 250 are across the screen 232ª of the thyratron in parallel. When the thyratron conducts, the capacitors' charge is reduced to the voltage across the thyratron. After the thyratron plate supply is cut off, the voltage at the screen 232ª will build up and cause the thyratron to keep on firing at the repetition rate determined by the adjustment of the variable resistance 253.

FIGURE 12 shows a wiring diagram in which a cathode ray tube 270 with five anode contacts 271 is adapted to perform the same function as the decade counter tube 227 of FIGURE 11. The flyback pulse of a saw-tooth sweep oscillator 272 supplies the transfer pulses for the decade counter tube 273. It is believed that, taken with the showing and description of FIGURES 1 and 5, the functions of the other components of FIGURE 12 will be clear.

In FIGURE 13, there is shown a single pulse telegraphic system where a special double-beam cathode ray tube 280 having one row of five anode contacts 281 and a second row of ten anode contacts 282, adapted to perform the functions of both decade counter tubes 227 and 228 of FIGURE 11. The oscillator 283 drives a saw-tooth oscillator 284 at its fundamental frequency. The saw-tooth oscillator 284, in turn, drives a second saw-tooth oscillator 286 operating at substantially one-fifth the frequency of the saw-tooth oscillator 284. The saw-tooth oscillator 286 sweeps the five contacts 281 of the cathode ray tube 280. Another saw-tooth oscillator 285 operating at one-fiftieth of the frequency of oscillator 284; sweeps the row of ten contacts 282. The fly-back pulse from this saw-tooth oscillator 285 is used as the transfer pulse for the decade counter tubes employed to multiply the number of machines operated. These multiplying decade counter tubes have been omitted from the drawings for the sake of simplicity, but may be of the form and arrangement of the decade counter tubes 41—42 of FIG. 1.

In the foregoing embodiments, suitable decade counter tubes or specially adapted cathode ray tubes are instanced as the preferred counter cycling means, however, other cycling means, well known to the art, using electron tubes or transistors may be employed. Conventional mechanical cycling means using a synchronous electric motor suitably adapted to drive rotary switches may be employed without departing from the spirit of the invention, such a motor being controlled by oscillator means, as in the foregoing embodiment, or by conventional connection to an alternating current power supply common to both transmitting and receiving typewriters. Also in the foregoing embodiments thyratrons are instanced as the preferred electronic switching means, however, monostable flip-flops, or other electronic circuits using electron tubes or transistors may be employed without departing from the spirit of the invention. In addition changes in the size, shape and arrangement of parts may be made to the forms of invention herein shown and described, without departing from the spirit of the invention or scope of the claims.

What is claimed is:

1. A system for remotely actuating the functions of at least one receiving typewriter in unison with the actuation of the same functions at a transmitting typewriter, all of the typewriters having similar keyboards wherein the keys are connected for actuation by combinations of electronic switches prearranged in at least two groups for each keyboard, the system comprising transmitter apparatus operatively connected with the transmitting typewriter; receiver apparatus operatively connected with the receiving typewriter; step-by-step counter cycling means at each apparatus and connected respectively with each of said groups of electronic switches, one combination count in each of the locally-grouped counter cycling means being operatively associated with two of the electronic switches; oscillator means in each apparatus and connected with the electronic counter cycling means therein for continuously actuating the latter at a uniform rate; synchronizing means in the transmitter and receiver apparatus for maintaining all of said cycling means precisely in step with each other; pulse means in the transmitter apparatus for transmitting a single pulse coinciding with at least one combination count of the counter means in response to the actuation of each function of the transmitting typewriter; electrical connecting means at the receiver apparatus connecting each counting step of the local counter means to an associated one of the keyboard electronic switches to apply an enabling bias to said switches successively as the counter cycling means is cycling; and coupling means in the receiving apparatus for applying the transmitted and received pulses to the electronic switches, whereby coincidence at the electronic valves between said pulse and an enabling bias causes actuation of the associated typewriter function.

2. A system according to claim 1 characterized in that said counter cycling means includes counter electrodes, electrically connected with each of said groups of electronic switches.

3. A system according to claim 1 characterized in that said counter cycling means includes counter anodes, electrically connected with each of said groups of electronic switches.

4. A system according to claim 1 characterized in that said counter means includes a plurality of decade counter tubes provided with transfer electrodes to which a transfer pulse is applied, and counter electrodes electrically connected with each of said groups of electronic switches.

5. A system according to claim 1 characterized in that said counter means includes an electron tube having a plurality of anodes electrically connected with each of said groups of electronic switches.

6. A system according to claim 1 characterized in that said cycling means includes a cathode ray tube having a control grid electrically connected with said receiver apparatus.

7. A system according to claim 1 characterized in that said electronic switches include a thyratron with the control grid thereof electrically connected with said counter cycling means.

8. A system according to claim 7 characterized in that said thyratron is provided with capacitor means across its screen circuit, electrically connected to said electronic switches.

9. A system according to claim 1 characterized in that said pulse means and said synchronizing means in the transmitter apparatus comprises means for initiating and delivering a substantially rectangular pulse during each cycle of the counter cycling means, each of said pulses having its leading edge comprising a first signal pulse and coincident with the beginning of a new counting cycle and having its trailing edge coincident with and comprising a second signal pulse initiated in response to the function of the typewriter being transmitted during that cycle of the counter cycling means; and said receiver apparatus including pulse differentiating, pulse inverting and coupling means for converting and applying the leading and trailing edges of each received rectangular pulse as two narrow pulses for synchronizing the oscillator means controlling the stepping action of the counter cycling means; the synchronizing means in the receiver including pulse integrating, switching and gate means connected to the local counter cycling means and the oscillator means for beginning a new cycle of the counter cycling means in response to the leading edge of the first signal pulse, both narrow signal pulses during each cycle being electrically connected through said coupling means to said electronic switches.

10. A system according to claim 1 characterized in that said pulse means and said synchronizing means in the transmitter apparatus comprises means for initiating and delivering a short pulse during each cycle of the counter cycling means, each of said pulses having its leading edge coincident with the beginning of a new counting cycle and comprising a signal pulse initiated in response to the function of the typewriter being transmitted during that cycle of the counter cycling means; and said receiver apparatus including pulse differentiating and coupling means for applying the leading edge of the pulse to the oscillator means controlling the stepping action of the counter cycling means to bring said oscillator means into synchronism; the synchronizing means in the receiver including pulse integrating, switching and gate means connected to the local counter cycling means and the oscillator means for beginning a new cycle of the counter cycling means in response to the leading edge of the signal pulse which, during each cycle, is electrically connected through said coupling means to said electronic switches.

11. A system for remotely actuating the functions of at least one receiving typewriter in unison with the actuation of the same functions at a transmitting typewriter, all of the typewriters having similar keyboards wherein the keys are connected for actuation by combinations of electronic switches prearranged in at least two groups for each keyboard, the system comprising transmitter apparatus operatively connected with the transmitting typewriter; receiver apparatus operatively connected with the receiving typewriter; step-by-step counter cycling means at each apparatus and connected respectively with each of said groups of electronic switches, one combination count in each of the locally-grouped counter cycling means being operatively associated with two of the electronic switches; oscillator means in each apparatus and connected with the electronic counter cycling means therein for continuously actuating the latter at a uniform rate and to provide a carrier wave; synchronizing means in the transmitter and receiver apparatus for maintaining all of said cycling means precisely in step with each other; pulse means in the transmitter apparatus for transmitting a single pulse to modulate a carrier wave derived from said oscillator means, said pulse means coinciding with at least one combination count of the counter means in response to the actuation of each function of the transmitting typewriter; electrical connecting means at the receiver apparatus connecting each counting step of the local counter means to an associated one of the keyboard electronic switches to apply an enabling bias to said switches successively as the counter cycling means is cycling; and coupling means in the receiving apparatus for applying the transmitted and received pulses to the electronic switches, whereby coincidence at the electronic valves between said pulse and an enabling bias causes actuation of the associated typewriter function.

12. A system for remotely actuating the functions of at least one receiving typewriter in unison with the actuation of the same functions at a transmitting typewriter, all of the typewriters having similar keyboards wherein the keys are connected for actuation by combinations of electronic switches prearranged in at least two groups for each keyboard, the system comprising transmitter apparatus operatively connected with the transmitting typewriter; receiver apparatus operatively connected with the receiving typewriter; step-by-step counter cycling means at each apparatus and connected respectively with each of said groups of electronic switches, one combination count in each of the locally-grouped counter cycling means being operatively associated with two of the electronic switches; oscillator means in each apparatus and connected with the electronic counter cycling means therein for continuously actuating the latter at a uniform rate; synchronizing means in the transmitter and receiver apparatus for maintaining all of said cycling means precisely in step with each other; pulse means in the transmitter apparatus for transmitting a single pulse coinciding with at least one combination count of the counter means in response to the actuation of each function of the transmitting typewriter; electrical connecting means at the receiver apparatus connecting each counting step of the local counter means to an associated one of the keyboard electronic switches to apply an enabling bias to said switches successively as the counter cycling means is cycling; coupling means in the receiving apparatus for applying the transmitted and received pulses to the electronic switches, whereby coincidence at the electronic valves between said pulse and an enabling bias causes actuation of the associated typewriter function; means for varying the relationship of said electronic switches with respect to said cycling means, including an electric switch, a magnetically-controlled multi-contact multi-bank transposition switch controlled by said electric switch, the last-named switch being closed each time a predetermined key of one of said typewriters is actuated upon actuation of the like key of the other of said typewriters.

No references cited.